United States Patent [19]
Graur

[11] Patent Number: 5,896,808
[45] Date of Patent: Apr. 27, 1999

[54] PORTABLE BROILER WITH ELECTRICALLY CONDUCTIVE LID

[76] Inventor: Walter Graur, 387 Jefferson St., Brooklyn, N.Y. 11237

[21] Appl. No.: 09/178,343

[22] Filed: Oct. 26, 1998

[51] Int. Cl.$^6$ .............................. A47J 37/00; A47J 37/06; H05B 3/06; F24C 7/10
[52] U.S. Cl. ............................. 99/331; 99/341; 99/372; 99/385; 99/426; 99/447; 219/386; 219/521; 219/525
[58] Field of Search .............................. 99/326, 331–333, 99/339–341, 372–378, 385, 389, 401, 426, 447, 449, 450, 451, 468, 481, 482; 219/386, 387, 404, 405, 407, 433, 439, 443, 454, 455, 521, 522, 525, 553; 426/523; D7/354; 392/435, 418, 423, 444

[56] References Cited

U.S. PATENT DOCUMENTS

| | | |
|---|---|---|
| 1,284,257 | 11/1918 | Dice . |
| 2,055,972 | 9/1936 | Fritsche ..................................... 219/37 |
| 2,895,405 | 6/1959 | Hopkins ..................................... 99/341 |
| 3,619,563 | 11/1971 | Hirst ........................................ 219/386 |
| 3,678,248 | 7/1972 | Tricault et al. .......................... 219/525 |
| 3,746,837 | 7/1973 | Frey et al. ............................... 219/387 |
| 3,757,675 | 9/1973 | Wilbricht ............................... 99/339 X |
| 3,974,358 | 8/1976 | Goltsos .................................. 99/374 X |
| 4,241,650 | 12/1980 | John et al. ................................. 99/372 |
| 4,294,003 | 10/1981 | Coverstone ......................... 392/435 X |
| 4,304,177 | 12/1981 | Loeffler et al. ........................... 99/333 |
| 4,364,308 | 12/1982 | John et al. ............................ 99/372 X |
| 4,390,551 | 6/1983 | Swartley et al. .................... 219/521 X |
| 4,577,092 | 3/1986 | Lenoir ..................................... 392/418 |
| 4,913,047 | 4/1990 | Burley .................................. 99/337 X |
| 5,054,467 | 10/1991 | Videtto, Jr. ........................... 99/341 X |
| 5,138,938 | 8/1992 | McClean ................................. 99/331 |
| 5,274,215 | 12/1993 | Jackson ............................... 219/521 X |
| 5,702,623 | 12/1997 | Sharples ............................. 392/444 X |

FOREIGN PATENT DOCUMENTS

| | | |
|---|---|---|
| 2012585 | 9/1971 | Germany . |
| 2339825 | 3/1975 | Germany . |

*Primary Examiner*—Timothy F. Simone
*Attorney, Agent, or Firm*—Charles E. Temko

[57] ABSTRACT

A portable electrically powered broiler including a base element connected to a source of power, and a lid element having a heating source which electrically communicates with the base element when the lid element is in position upon the base element. The base element includes selectively removable grill and pan members. In an alternate embodiment, the lid element is at least partially formed from electrically resistive tempered glass to form the heating source.

6 Claims, 4 Drawing Sheets

PORTABLE BROILER WITH ELECTRICALLY CONDUCTIVE LID

BACKGROUND OF THE INVENTION

This invention relates generally to the field of electrically powered cooking devices, and more particularly to an improved broiler suitable for either indoor or outdoor use in which the heating element is positioned above the food, rather than beneath the food to obtain a true broiling action, as distinguished from a frying or roasting cooking process.

In the broiling of foods, such as meats, it is known to position the heat source above the food which is supported upon a grill so that gravy, melted fat and the like can be collected in a pan disposed therebeneath. Most indoor cooking ranges, both electric and gas fired types normally include an enclosure which serves this purpose in addition to separate heat sources positioned beneath the food product for baking.

However, most portable outdoor cooking devices using either charcoal or propane gas have heat sources disposed beneath a grill which supports the food. As cooking progresses, drippings fall upon the burning charcoal or heated lava rock to be ignited and consumed. As a result, there is little or no gravy, and the meat is often undesirably charred to effect the flavor of the meat. A true broiling process is not obtained.

SUMMARY OF THE INVENTION

Briefly stated, the invention contemplates the provision of an improved electrically powered portable cooking device capable of providing a true broiling action upon the contained food. To this end, the device includes an upper lid positioned upon a base element. The lid element includes an electrically powered heating source having a jack positioned at a peripheral edge thereon. The base element includes a food supporting grate and an underlying drip pan, as well as a corresponding plug. The plug electrically communicates with a second plug on an outer surface of the base element for engaging one end of a power cord, thus permitting the device to be used outdoors. The heating source becomes active as soon as the lid element is engaged with the base element, and will normally not require cleaning. As the food is broiled, drippings are collected within the base element. In a preferred embodiment, both the food supporting grill or grate and the drip pan are slidably mounted within the base element, so as to be at least partially movable from the base element to permit turning of the meat without the necessity of disconnecting the lid element. In an alternate embodiment, the heating source includes a resistive glass integrated into the lid element to permit viewing of the food as it is cooked. In this embodiment, a pair of jacks and plugs are disposed at opposite ends of the lid element.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENTS

Figure 1:
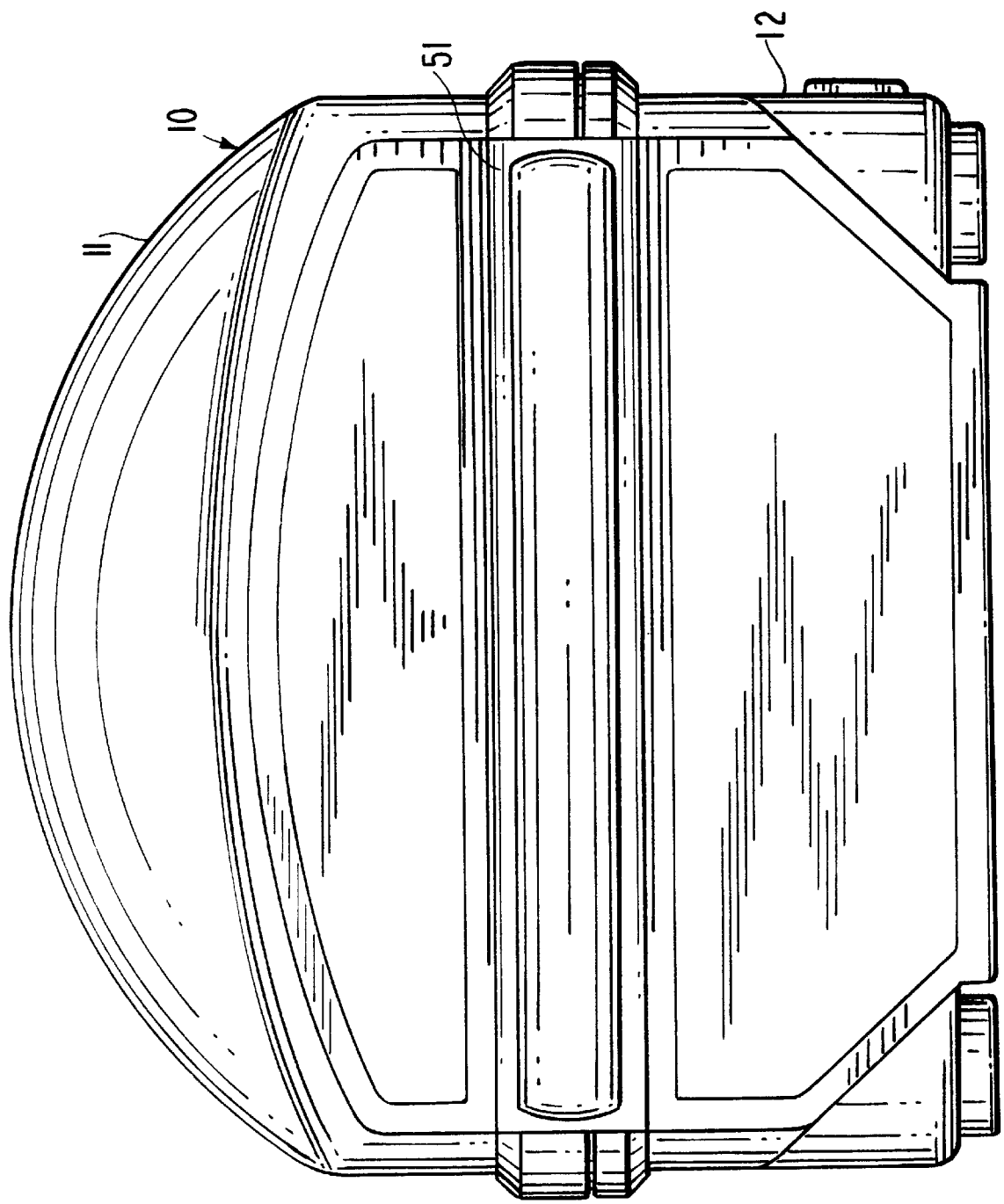
FIG. 1 is a schematic front elevational view of an embodiment of the invention.

In accordance with the first embodiment of the invention (FIGS. 1–3), the device, generally indicated by reference character 10, comprises an upper lid element 11, a lower base element 12, and an electrically powered heat source 13.

The lid element may be formed as a drawing of stainless steel, but it is preferably formed from transparent tempered glass, so as to permit the user to view the progress of a cooking operation. It is of hollow configuration, bounded by an outer surface 21, an inner surface 22, the surfaces meeting at a continuous peripheral edge 23. A handle (not shown) may be provided on the outer surface 21. Since it is possible to remove the food by sliding a food supporting grate, it will not be necessary to disengage the lid element except for purposes of cleaning.

The base element 12 is preferably formed as a drawing from 24 gauge stainless steel. It is also of hollow configuration and bounded by an outer surface 30, and an inner surface 31 meeting at a continuous peripheral edge surface 32. Plural inner brace members 33 include inclined surfaces 34 which support a lower pan member 35 and a perforate grill member 36 disposed thereabove. The upper surface of the grill 36 supports the food product 37 to be cooked. Support legs or pads 38 are attached by a suitable nut and bolt means 39 to enable the base element to be supported above a horizontal surface, and impede transfer of heat generated to that surface (not shown).

Figure 2:
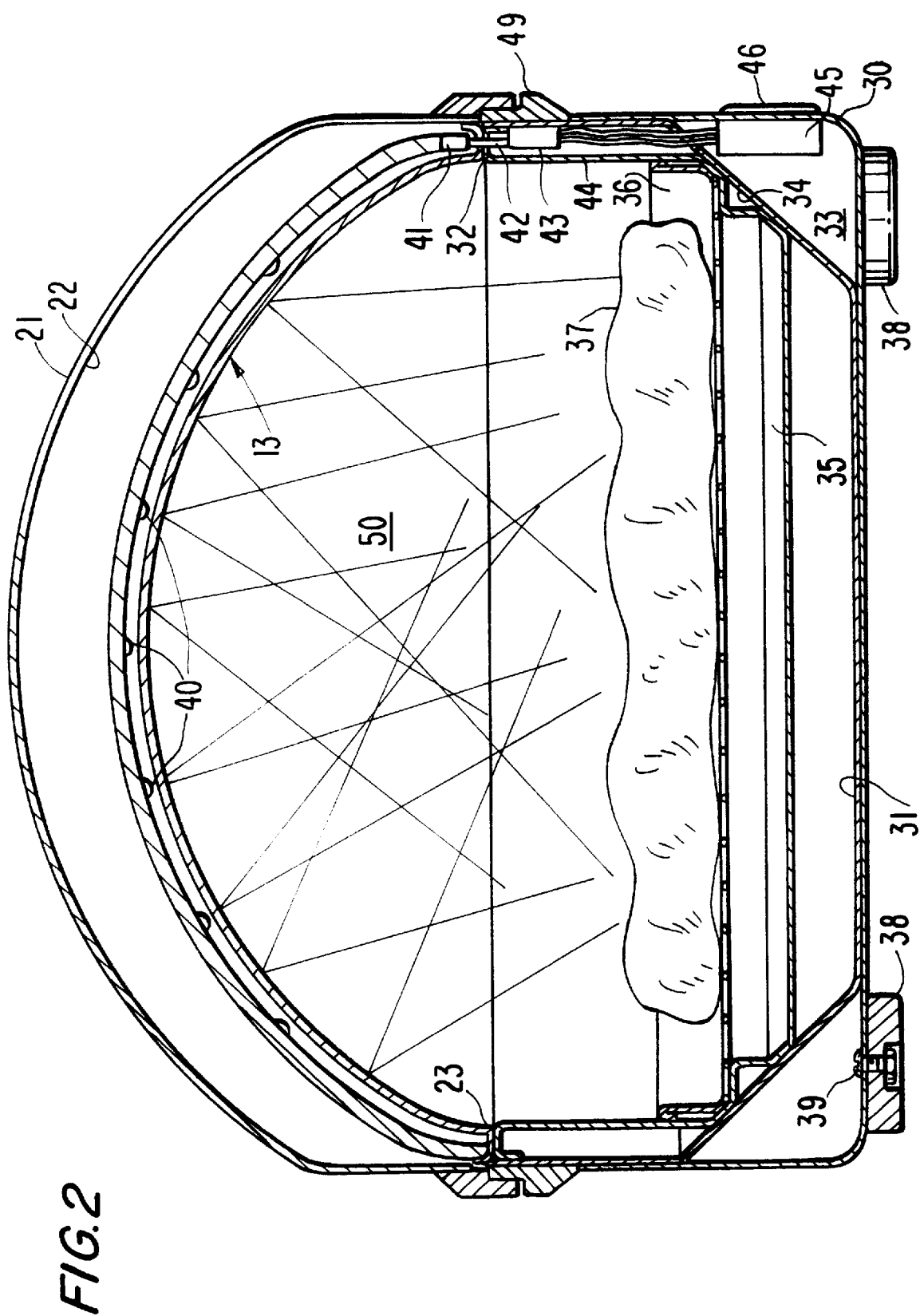
FIG. 2 is a transverse schematic central sectional view thereof.
Figure 3:
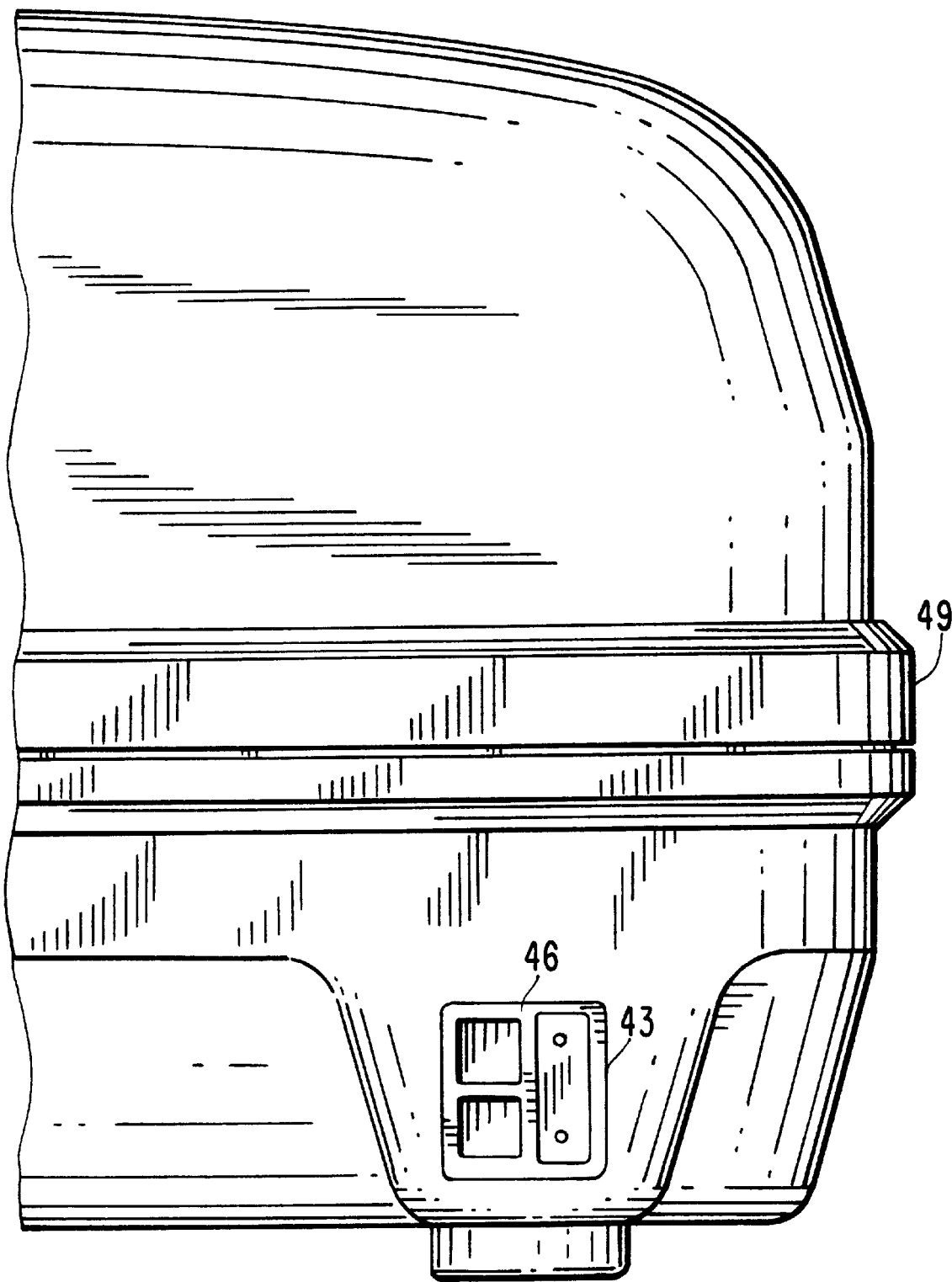
FIG. 3 is a fragmentary schematic side elevational view thereof.

The heating source 13 consists of a plurality of electrically resistive rods, one of which is indicated by reference character 40 which include a common communicating jack means 41 having downwardly projecting pins 42 (FIG. 2). Mounted on the inner surface 31 is a corresponding plug 43 from which a conductor 44 extends downwardly to communicate with a second plug 45. The plug 45 includes an exposed surface 46 (FIG. 3) for selective interconnection with a power cord (not shown) which may be of any required length. A continuous flange 49 carried by the base element 12 surrounds the lower edge of the lid element to effect a seal against heat loss. There is thus provided, an internal void or cavity 50 during a cooking operation.

During cooking, the pan member 35 and grill 36 may be moved longitudinally outwardly to enable to food product to be turned at periodic intervals by manually grasping, using protective gloves, and a handle 51. These elements are preferably completely removable, since the bulk of cleaning operations at periodic intervals will be confined to this structure.

Figure 4:
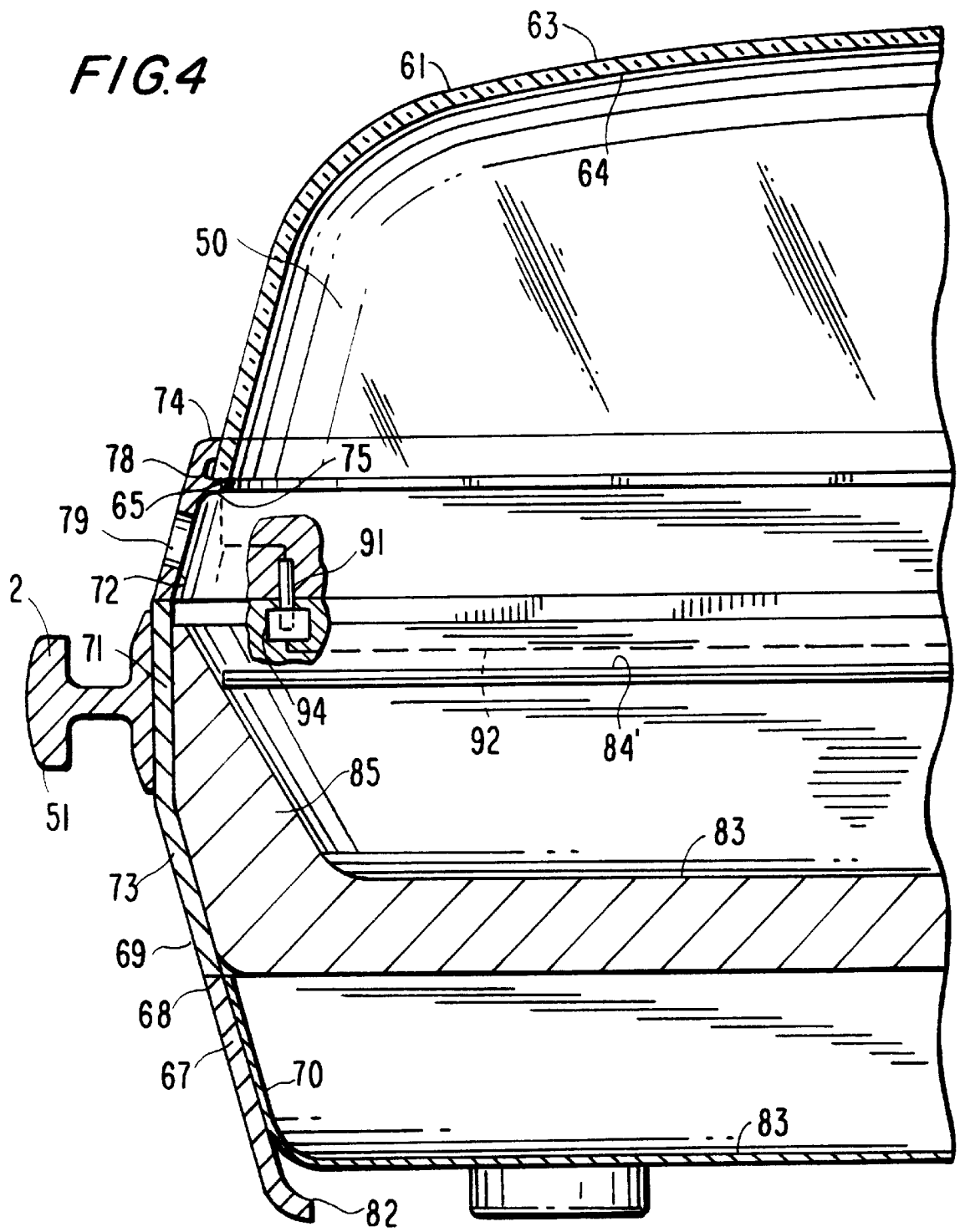
FIG. 4 is a longitudinal schematic sectional view of an alternate embodiment.

Turning now to the second embodiment of the invention (FIG. 4), the structure has been somewhat simplified. The lid element 61 is formed from tempered glass which is electrically resistive, thus eliminating the need for a separate heating source as in the principal embodiment. The lid element is bounded by an outer surface 63, and an inner surface 64 meeting at a peripheral edge surface 65. The base element 67 includes a continuous side wall 68 bounded by outer surface 69 and inner surface 70. A cylindrical portion 71 communicates with an upper tapered portion 72 and a lower tapered portion 73. The upper portion 72 is bounded by an upper end edge and forms first and second radially inwardly extending members 74 and 75 which provide a mating recess 78 for the lid element. Optional vent openings 79 may be provided. The lower tapered portion 73 includes an inwardly extending flange 82. The inner surface 84 supports both a drip pan 83 having a tapered side wall 85 and a cast grill member 84.

Since current travels through all parts of the electrically resistive glass, it is necessary to provide a pair of jacks 90, 91, and a pair of plugs 93,94, the latter having a conductive member 92 which returns current to the jack 95 on the base element.

It may thus be seen that I have provided novel and highly useful improvements in outdoor cooking devices which, using a minimum of component parts, provide a true broiling operation of a type normally obtainable only using indoor ranges. In each embodiment the device includes essentially a lid element including an electrically powered heat source which mates with a lower base element which supports the food beneath the lid element and provides for electrical communication between the heating source and a source of power communicating with the base element. The grill and pan elements may be longitudinally slidable to permit turning of the food product during cooking, and may be totally disengaged for cleaning purposes. Moreover, the lid element may be disconnected from the base element for periodic cleaning, and electrical interconnection of the heat source is resumed as soon as the lid element is again positioned upon the base element.

I wish it to be understood that I do not consider the invention to be limited to the precise details of structure shown and described in the specification, for obvious modifications will occur to those skilled in the art to which the invention pertains.

I claim:

1. A portable cooking device for broiling food, comprising: an upper lid element, a lower base element, and an electrically powered heating element; said cover element being of hollow configuration defining a cavity bordered by a peripheral edge; said heating element being positioned within said cavity and having first selectively electrically interconnecting means positioned at said peripheral edge; said base element also being of hollow configuration defining a cavity bordered by a peripheral edge which selectively mates with said peripheral edge on said lid element; said base element having corresponding second electrically interconnecting means positioned at said peripheral edge of said base element, said base element communicating with a source of electrical power; whereby, upon the engagement of said lid element with said base element, said heating element communicates with said source of electrical power.

2. A cooking device in accordance with claim 1, said base element having a selectively removable perforate grill, and a pan positioned beneath the said grill.

3. A cooking device in accordance with claim 1, in which said first and second electrically communicating means comprise a plug and corresponding jack.

4. A cooking device in accordance with claim 3, said base element having a second plug exposed on an outer surface thereof for interconnecting with a power cord.

5. A cooking device in accordance with claim 1 in which said lid element is at least partially formed from tempered glass.

6. A device in accordance with claim 5, in which said lid element is at least partially formed from electrically resistive tempered glass to form said heating element.

\* \* \* \* \*